(12) United States Patent
Shimizu

(10) Patent No.: US 9,672,275 B2
(45) Date of Patent: Jun. 6, 2017

(54) RECOMMENDATION APPARATUS, RECOMMENDATION METHOD, AND STORAGE MEDIUM

(71) Applicant: CANON KABUSHIKI KAISHA, Tokyo (JP)

(72) Inventor: Tomoyuki Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 14/224,613

(22) Filed: Mar. 25, 2014

(65) Prior Publication Data

US 2014/0297677 A1    Oct. 2, 2014

(30) Foreign Application Priority Data

Mar. 29, 2013  (JP) ................................ 2013-073891

(51) Int. Cl.
*G06F 17/30* (2006.01)
(52) U.S. Cl.
CPC ................................ *G06F 17/3064* (2013.01)
(58) Field of Classification Search
CPC ........... G06F 17/3064; G06F 17/30867; G06F 17/30864; G06Q 10/101; G06Q 10/103
See application file for complete search history.

(56) References Cited

U.S. PATENT DOCUMENTS

| | | | |
|---|---|---|---|
| 7,434,244 B2 * | 10/2008 | Popov | H04N 7/163 348/E7.061 |
| 8,260,656 B1 * | 9/2012 | Harbick | G06Q 30/02 705/26.7 |
| 8,429,179 B1 * | 4/2013 | Mirhaji | G06F 17/30312 707/756 |
| 2005/0171965 A1 * | 8/2005 | Fujimoto | G06F 21/62 |
| 2011/0282888 A1 * | 11/2011 | Koperski | G06F 17/30864 707/752 |
| 2013/0117296 A1 * | 5/2013 | Mizuguchi | G06Q 50/01 707/758 |
| 2014/0046965 A1 * | 2/2014 | Tian | G06F 17/30648 707/749 |
| 2014/0156638 A1 * | 6/2014 | Joshi | G06F 17/30566 707/722 |
| 2016/0004699 A1 * | 1/2016 | Liu | G06F 17/30029 707/734 |
| 2016/0085816 A1 * | 3/2016 | Sakai | G06F 17/30528 707/734 |

FOREIGN PATENT DOCUMENTS

JP       2011-165169 A       8/2011

* cited by examiner

*Primary Examiner* — Robert Beausoliel, Jr.
*Assistant Examiner* — Susan F Rayyan
(74) *Attorney, Agent, or Firm* — Canon U.S.A., Inc. IP Division

(57) ABSTRACT

There is provided a technique capable of recommending more useful contents to a recommendation target user who is the current work user. A group of recommendation candidate contents is obtained from a similar work case similar to work by the recommendation target user. A relationship between an arbitrary user and the recommendation candidate contents is detected. Recommendation candidate contents having the detected relationship with the recommendation target user are recommended by priority from among the group of recommendation candidate contents.

13 Claims, 16 Drawing Sheets

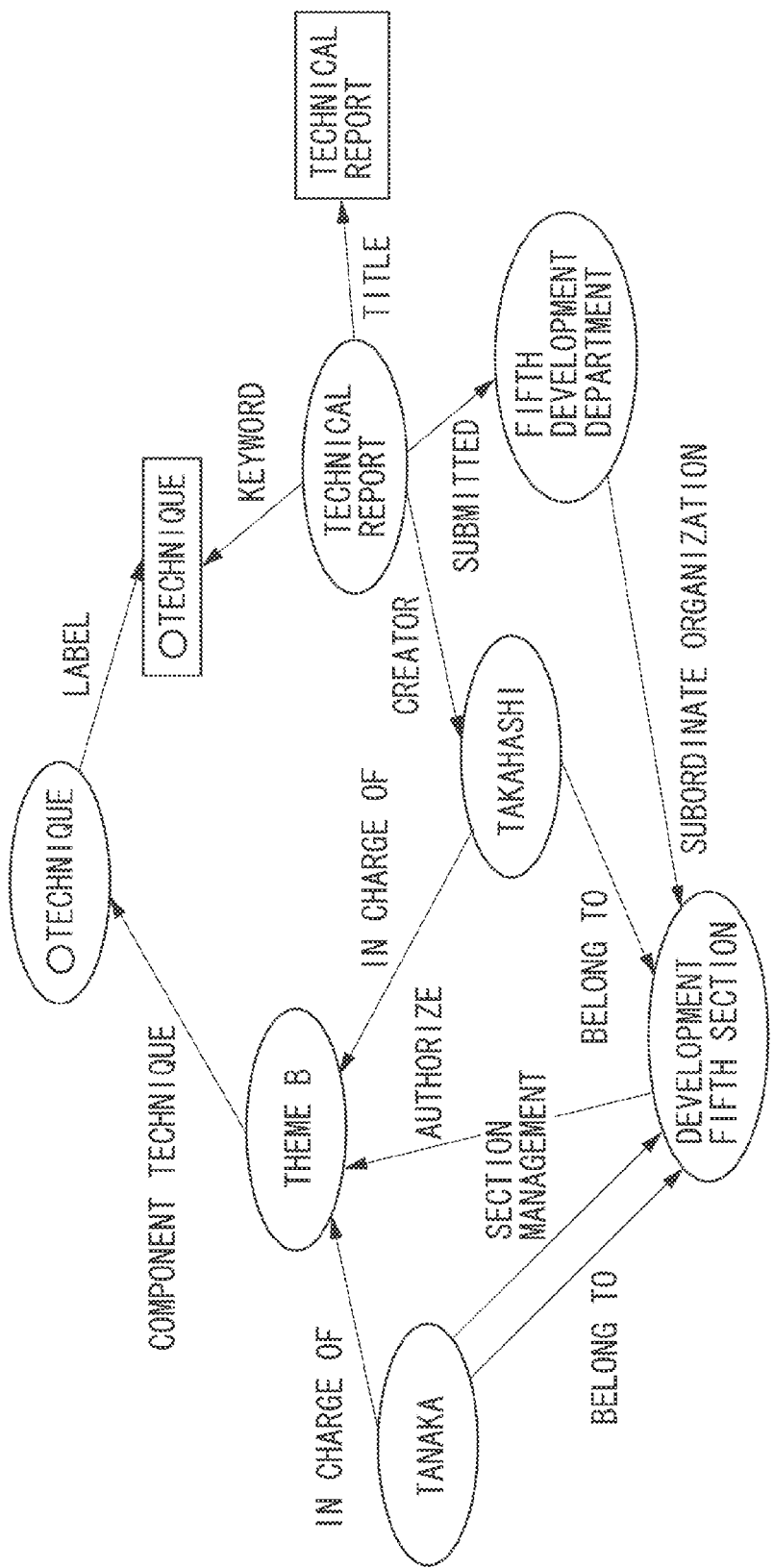

RECOMMENDATION APPARATUS, RECOMMENDATION METHOD, AND STORAGE MEDIUM

BACKGROUND OF THE INVENTION

Field of the Invention

The present invention relates to a recommendation apparatus and a recommendation method for recommending contents to a recommendation target user who is the current work user, and a storage medium storing a program for causing a computer to perform the recommendation method.

Description of the Related Art

Conventionally, a collaborative filtering technique has been commonly used to perform processing for recommending contents by using users' work logs. The collaborative filtering technique includes identifying another user (hereinafter, referred to as "similar user") having similar features to those of a person to be recommended (hereinafter, referred to as a "recommendation target user") and recommending an action that the similar user took in the current situation of the recommendation target user (for example, see Japanese Patent Application Laid-Open No. 2011-165169).

Another conventional technique includes extracting and classifying flows of work from use histories of files having the same intended use, defining the classified individual pieces of work as workflows, and recommending contents belonging to a workflow.

According to the conventional techniques, contents useful to a similar user or in the past work can be recommended. Such recommendation, however, is not made in terms of contents useful to the recommendation target user who is the current work user. There has been a problem that contents not necessarily useful to the recommendation target user may be recommended.

SUMMARY OF THE INVENTION

The present invention is directed to a technique capable of recommending more useful contents to a recommendation target user who is the current work user.

According to an aspect of the present invention, a recommendation apparatus of contents, includes an acquisition unit configured to obtain a group of recommendation candidate contents from a similar work case similar to work by a recommendation target user, a detection unit configured to detect a relationship between an arbitrary user and the recommendation candidate contents, and a recommendation unit configured to recommend recommendation candidate contents having the detected relationship with the recommendation target user by priority from among the group of recommendation candidate contents.

Other aspects of the present invention include a recommendation method by the recommendation apparatus and storage medium storing a program for causing a computer to perform the recommendation method.

Further features of the present invention will become apparent from the following description of exemplary embodiments with reference to the attached drawings.

BRIEF DESCRIPTION OF THE DRAWINGS

FIG. 11 is a diagram an example of contents having the conceptual relationship with a recommendation target user, according to the first exemplary embodiment of the present invention.

DESCRIPTION OF THE EMBODIMENTS

Various exemplary embodiments, features, and aspects of the invention will be described in detail below with reference to the drawings.

Figure 1:
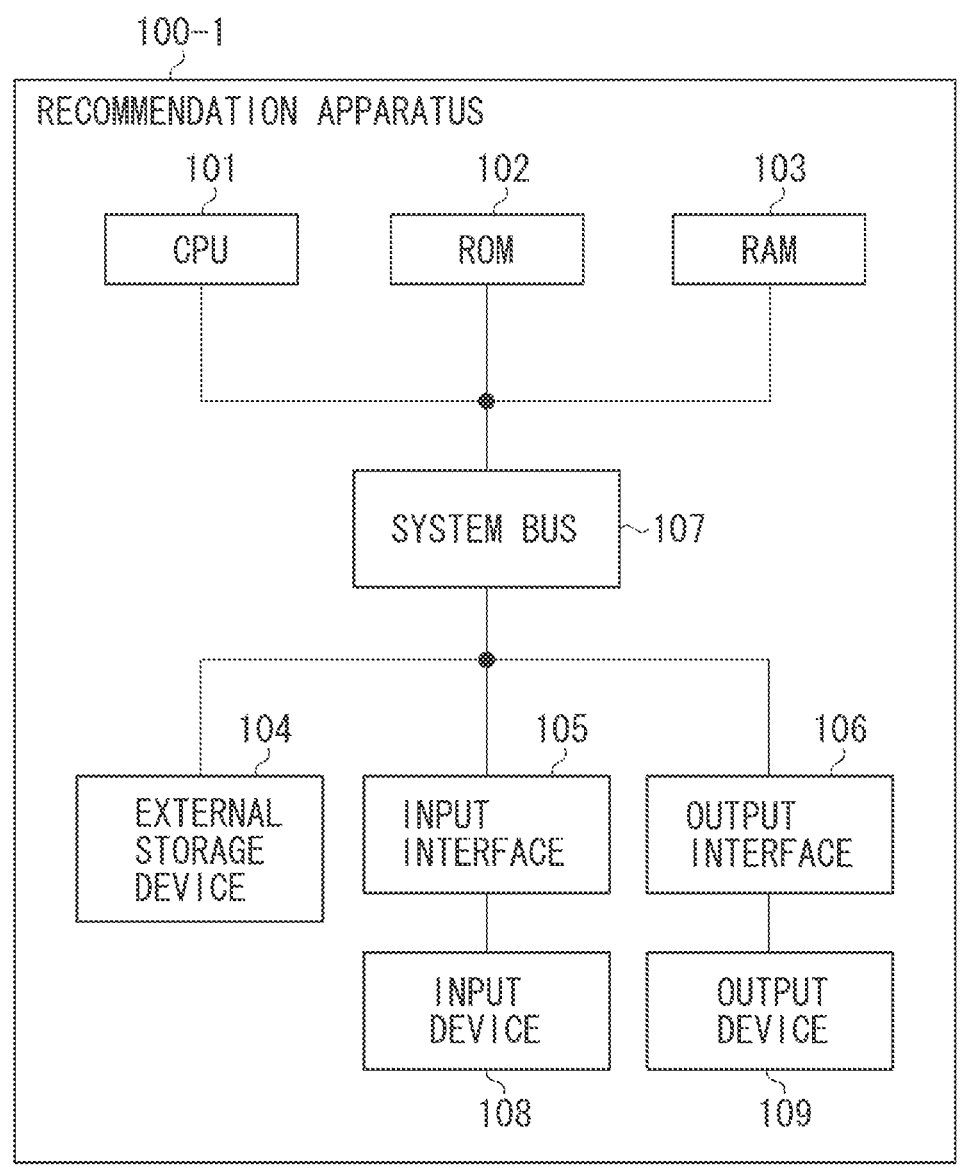
FIG. 1 is a block diagram illustrating an example of a hardware configuration of a recommendation apparatus according to a first exemplary embodiment of the present invention.

FIG. 1 is a block diagram illustrating an example of a hardware configuration of a recommendation apparatus according to a first exemplary embodiment of the present invention. The recommendation apparatus illustrated in FIG. 1 will hereinafter be referred to as a "recommendation apparatus 100-1".

For example, the recommendation apparatus 100-1 may be implemented by a computer apparatus. The recommendation apparatus 100-1 may be implemented by distributing its functions among a plurality of computer apparatuses if needed.

As illustrated in FIG. 1, the recommendation apparatus 100-1 includes a hardware configuration including a central processing unit (CPU) 101, a read only memory (ROM) 102, a random access memory (RAM) 103, an external storage device 104, an input interface 105, an output interface 106, a system bus 107, an input device 108, and an output device 109.

The CPU 101 controls the entire recommendation apparatus 100-1, for example, by using a program, data, and information stored in the ROM 102 or the external storage device 104.

The ROM 102 is a storage medium that stores a program or programs, various types of data, and information such as various parameters that need no change.

The RAM 103 includes an area that temporarily stores a program or programs, data, and information loaded from the ROM 102 or the external storage device 104. The RAM 103 further includes a work area that the CPU 101 needs to perform various types of processing.

The external storage device 104 is a storage medium that stores, for example, an operating system (OS), programs to be executed by the CPU 101e, and data and information that are assumed to be known in the description of the present exemplary embodiment. In the present exemplary embodiment, a program for executing processing according to the exemplary embodiment of the present invention is stored in the external storage device 104. The present exemplary embodiment is also applicable, for example, in a form in which such a program is stored in the ROM 102.

Examples of the external storage device 104 include a hard disk (HD) that is fixedly mounted on the recommendation apparatus 101-1 and a memory card, and a flexible disk (FD), an optical disk such as a compact disc (CD), a magnetic card, an optical memory card, an integrated circuit (IC) card, and a memory card that are detachably attached to the recommendation apparatus 100-1. For example, the external storage device 104 stores large-sized information not suitable for storage in the RAM 103. In the present exemplary embodiment, for example, division knowledge information corresponds to such information.

The input interface 105 is an interface with the input device 108 for accepting user's operations. Examples of the input device 108 include a pointing device and a keyboard.

The output interface 106 is an interface with the output device 109 such as a monitor and a printer.

The system bus 107 connects the CPU 101, the ROM 102, the RAM 103, the external storage device 104, the input interface 105, and the output interface 106 with each other in a communicable manner.

Next, another example of the hardware configuration of the recommendation apparatus according to the present exemplary embodiment will be described.

Figure 2:
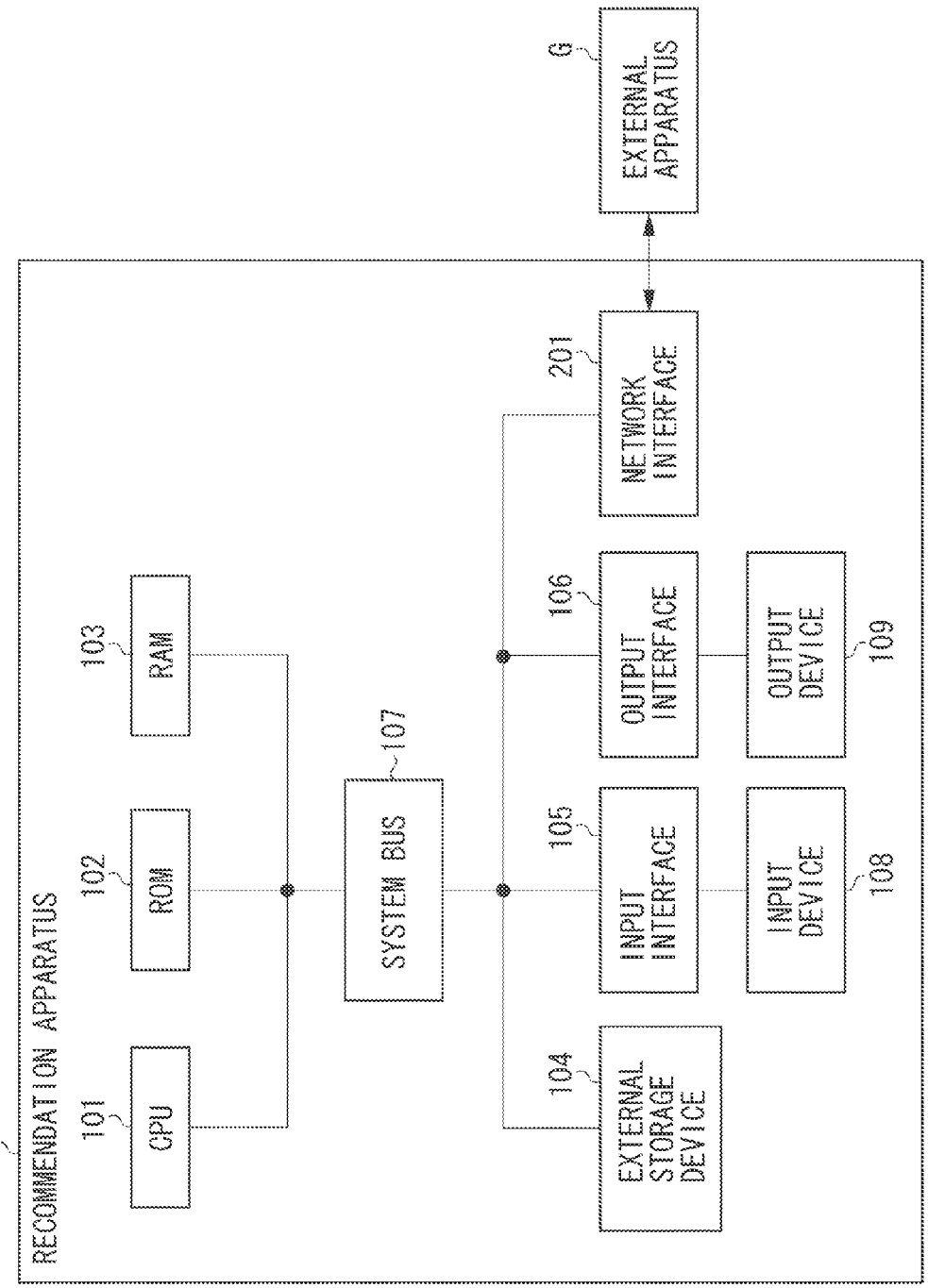
FIG. 2 is a block diagram illustrating an example of the hardware configuration of the recommendation apparatus according to the first exemplary embodiment of the present invention.

FIG. 2 is a block diagram illustrating an example of the hardware configuration of the recommendation apparatus according to the first exemplary embodiment of the present invention. The recommendation apparatus illustrated in FIG. 2 will hereinafter be referred to as a "recommendation apparatus 100-2". In FIG. 2, similar components to those illustrated in FIG. 1 are designated by the same reference numerals.

Specifically, the recommendation apparatus 100-2 illustrated in FIG. 2 is the recommendation apparatus 100-1 illustrated in FIG. 1 to which a hardware configuration of a network interface 201 is added.

The network interface 201 controls transmission and reception of various types of information and various types of signals between the recommendation apparatus 100-2 and an external apparatus G.

For example, in a case where a plurality of computer apparatuses constitutes a recommendation apparatus, the network interface 201 is provided as in the recommendation apparatus 100-2 illustrated in FIG. 2, and the recommendation apparatus and an external apparatus G are connected via a local area network (LAN) in a mutually communicable manner.

Next, a recommendation system according to the present exemplary embodiment will be described.

Figure 3:
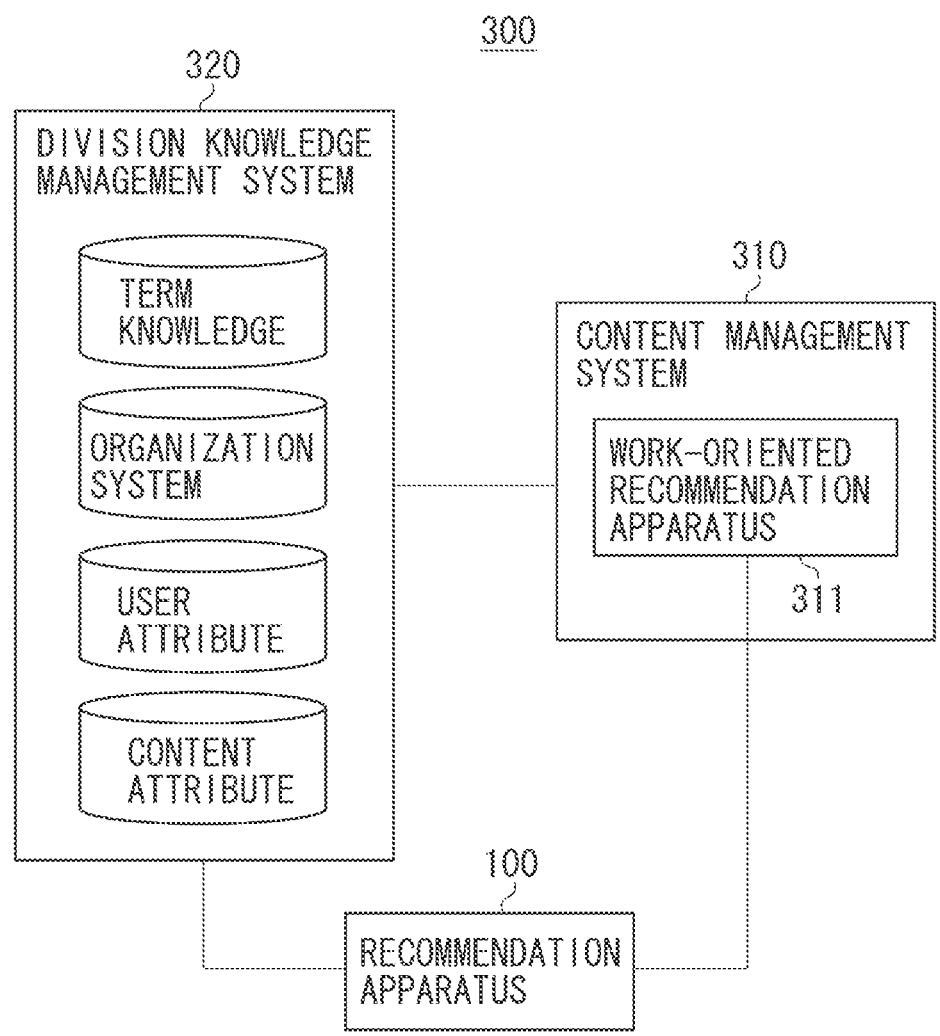
FIG. 3 is a block diagram illustrating an example of a general configuration of a recommendation system according to the first exemplary embodiment of the present invention.

FIG. 3 is a block diagram illustrating an example of a general configuration of the recommendation system according to the first exemplary embodiment of the present invention.

As illustrated in FIG. 3, the recommendation system 300 includes a recommendation apparatus 100, a content management system 310, and a division knowledge management system 320.

The content management system 310 stores and manages information to be used by the recommendation apparatus 100. Specifically, the content management system 310 operates as a front end for content management by a user or users, and provides functions such as reference, copy, printing, registration and storage, and a search of contents. The content management system 310 stores a history of performed work as log information in which users who have performed the work and the contents of the work are recorded. In the present exemplary embodiment, a user who is currently working by using the content management system 310 is referred to as a recommendation target user. In the present exemplary embodiment, the content management system 310 includes at least a work-oriented recommendation apparatus 311.

The work-oriented recommendation apparatus 311 will be described below.

The work-oriented recommendation apparatus 311 presents contents suitable for work of the current recommendation target user as recommendation candidate contents based on a past user work history. For example, suppose that the recommendation target user is attempting to perform work of opening a document template and generating new contents. Such a case will be described with reference to FIG. 7.

Figure 7:
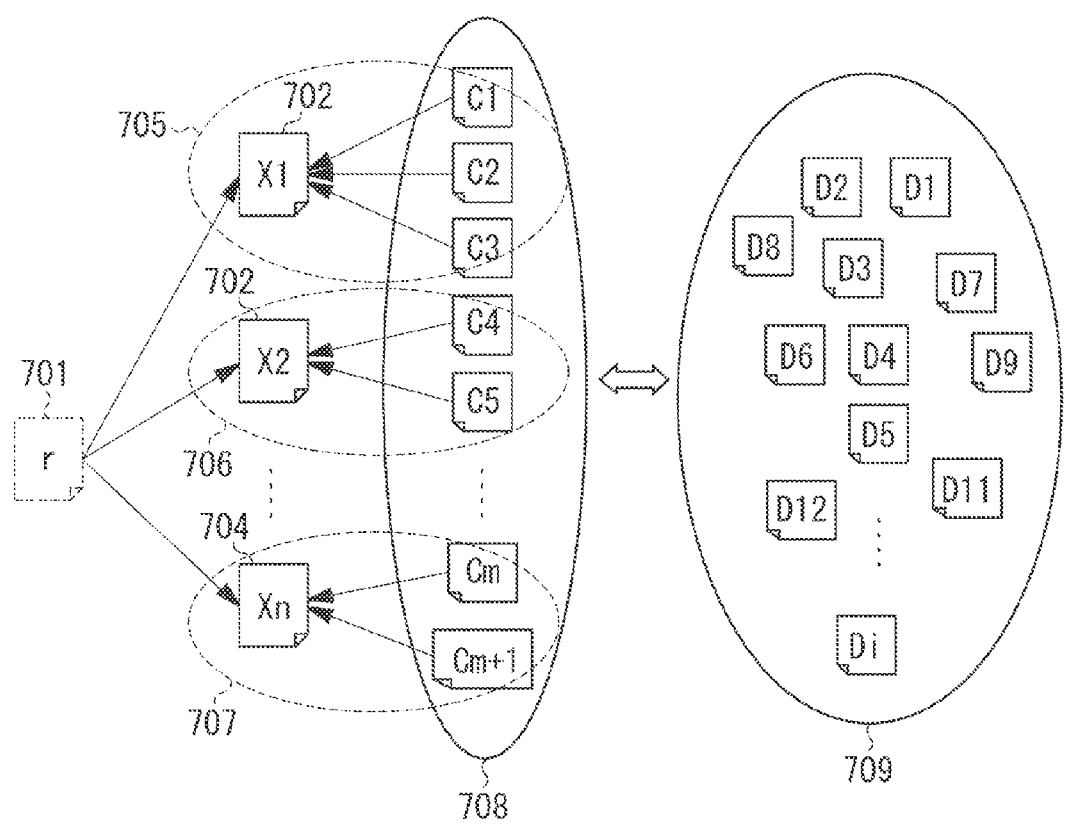
FIG. 7 is a diagram illustrating a conceptual configuration of similar work cases and recommendation candidate contents detected by a work-oriented recommendation apparatus illustrated in FIG. 3, according to the first exemplary embodiment of the present invention.

FIG. 7 is a diagram illustrating a conceptual configuration of similar work cases and recommendation candidate contents detected by the work-oriented recommendation apparatus 311 illustrated in FIG. 3, according to the first exemplary embodiment of the present invention.

For example, in FIG. 7, the work-oriented recommendation apparatus 311 detects work performed when a user or users generated new contents X1 to Xn (702 to 704) from a template T 701 in the past as cases of similar work (hereinafter, referred to as "similar work cases"). In the similar work, the contents X1 to Xn (702 to 704) were generated by simultaneously using some contents (hereinafter, referred to as "simultaneously used contents") 708 for reference or citation purposes. The similar work (705 to 707) includes the use of such simultaneously used contents 708.

For example, the work-oriented recommendation apparatus 311 detects a group of contents 709 that are considered to be generated for similar purposes or uses to those of the group of simultaneously used contents 708 in the similar work 705 to 707. The work-oriented recommendation apparatus 311 may determine the group of contents 709 having similar purposes or uses by evaluating similarities. Examples of the similarities include that a filename is similar, that structure information about the contents is similar, that the dependency of simultaneous use on other contents is similar, and that a derivation relationship, like being generated from the same contents, is similar to that of contents in the group of simultaneously used contents 708. The work-oriented recommendation apparatus 311 evaluates the similarities in terms of whether the contents are generated or used for similar purposes, not the similarities of the contents themselves.

The groups of contents 708 and 709 thus obtained are presented as recommendation candidate contents highly effective for simultaneous use in the current work. A conventional unit may be used to present recommendation candidate contents. Specifically, such a unit analyzes a work log stored in the content management system 310 to extract several work patterns based on similarities of patterns in the work log. The unit obtains a group of contents to be recommended for simultaneous use from the work pattern. Subsequently, the unit constantly monitors the work log. If work similar to any one of the extracted work patterns is detected, the unit recommends the obtained group of contents to the recommendation target user currently at work.

Other then the work of generating new contents from a template, which has been described above as an example, the work-oriented recommendation apparatus 311 may handle work including a greater number of steps. For example, the work-oriented recommendation apparatus 311 may handle a flow of work including opening an existing document, generating another new document, referring to several other documents, printing the new generated document, and then registering the new generated document. To find out a pattern of similar work in such a work procedure, the orientation-oriented recommendation apparatus 311 may extract a pattern in consideration of some changes of the work procedure in order.

The content management system 310 according to the present exemplary embodiment uses such a work-oriented recommendation apparatus 311 to provide the function of detecting and presenting contents to be recommended for simultaneous use in each piece of work on the content management system 310 by the user. The work-oriented recommendation apparatus 311 according to the present exemplary embodiment can transmit information to the recommendation apparatus 100. The information to be transmitted includes information about similar work cases in similar work similar to the current work of the recommendation target user and information about a group of contents presented as recommendation candidate contents by the work-oriented recommendation apparatus 311 (hereinafter, referred to as a "group of recommendation candidate contents). The work-oriented recommendation apparatus 311 can receive evaluation about the provided group of recommendation candidate contents from the recommendation apparatus 100. The work-oriented recommendation apparatus 311 can determine which contents to recommend according to the evaluation. The recommendation apparatus 100 and the work-oriented recommendation apparatus 311 need not be separated from each other. The content management system 310 may include a recommendation apparatus that analyzes a work history and recommends contents. In such a case, for example, the recommendation apparatus 100 performs the detection of similar work cases and the extraction of recommendation candidate contents illustrated in FIG. 7. A content evaluation unit 405 to be described below performs up to the determination of which contents to recommend according to the evaluation of the recommendation candidate contents.

The division knowledge management system 320 stores and manages information to be used by the recommendation apparatus 100. Specifically, the division knowledge management system 320 systematically arranges and stores various types of information about divisions and domains to be dealt with the divisions. The division knowledge system 320 stores knowledge information corresponding to ontology, such as the foregoing information, conceptual structures thereof, relationships between concepts, and definitions of the relationships. For example, in the present exemplary embodiment, the division knowledge management system 320 stores information illustrated in FIGS. 8A, 8B, 8C, and 9.

Figure 8A:
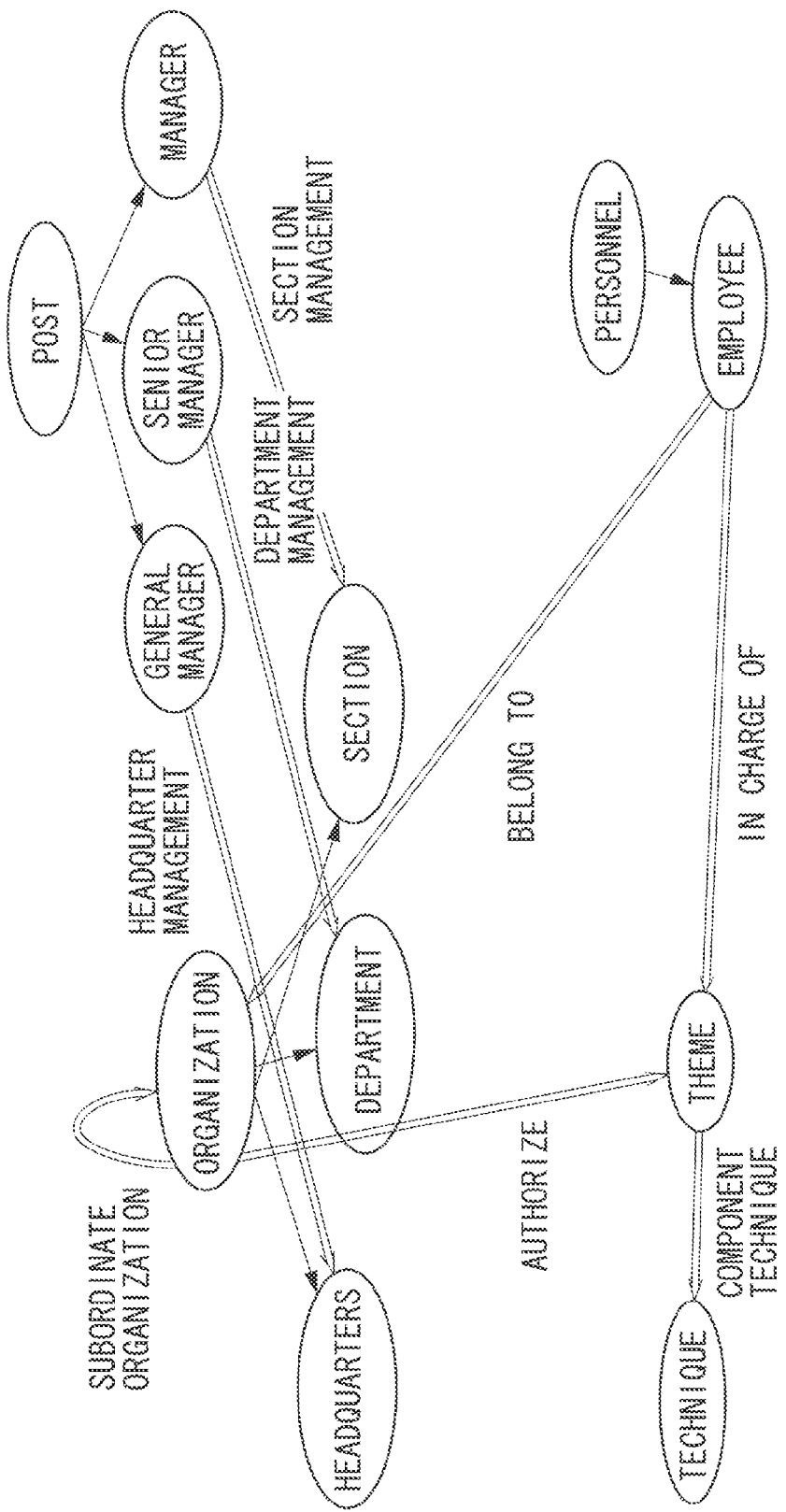
FIGS. 8A, 8B, and 8C are diagrams illustrating an example of knowledge about persons and organizations stored in a division knowledge management system of FIG. 3, according to the first exemplary embodiment of the present invention.
Figure 8B:
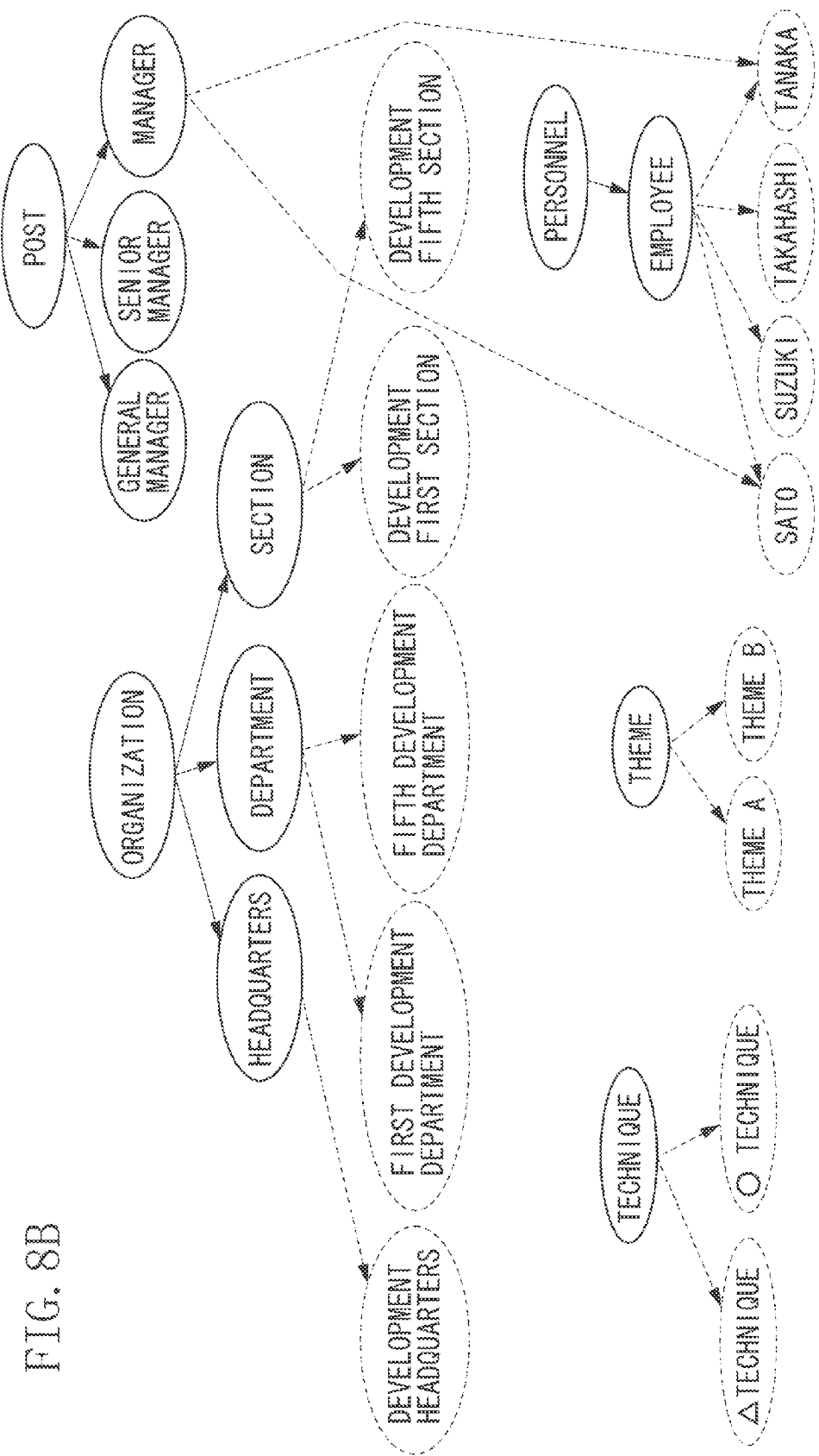
Figure 8C:
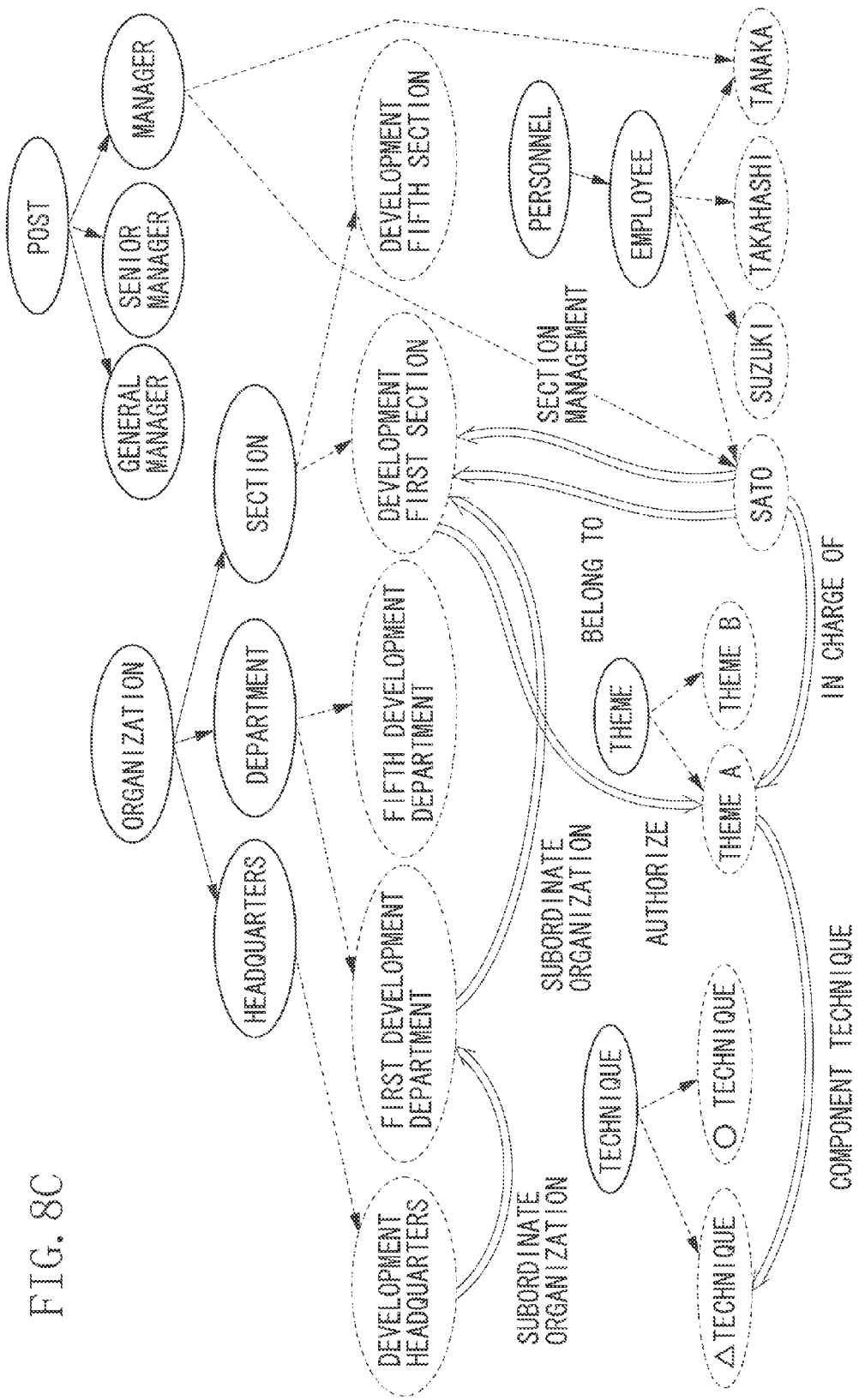

FIGS. 8A, 8B, and 8C are diagrams illustrating an example of knowledge about persons and organizations stored in the division knowledge management system 320 of FIG. 3, according the first exemplary embodiment of the present invention.

Figure 9:
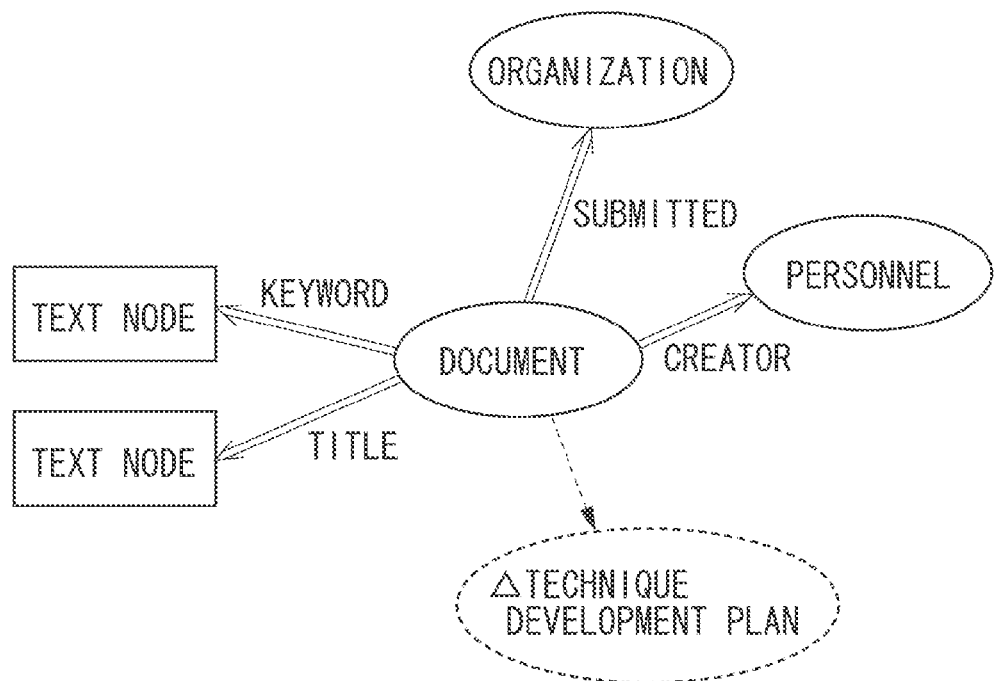
FIG. 9 is a diagram an example of knowledge about contents stored in the division knowledge management system of FIG. 3, according to the first exemplary embodiment of the present invention.

FIG. 9 is a diagram illustrating an example of knowledge about contents, stored in the division knowledge management system 320 of FIG. 3 according to the first exemplary embodiment of the present invention.

FIG. 8A illustrates an example of concepts (sometimes referred to as classes or types) of pieces of information and a relationship between the concepts. In FIG. 8A, words surrounded by ellipses represent concepts. A single arrow between concepts represents the relationship that the concept at the top of the arrow is a subordinate one. Double arrows represent other relationships between concepts. In FIG. 8A, the latter relationships are indicated by italic characters accompanying the respective arrows. For example, FIG. 8A illustrates that the concept "employee" has the relationship of "belonging to" the concept "organization". Subordinate concepts inherit the relationship of superordinate ones. "Section", a subordinate concept of "organization", may have the relationship of "belonging to" with "employee".

FIG. 8B illustrates an example of information belonging to each concept (hereinafter, such information will be referred to as an "instance"). In FIG. 8B, dotted arrows indicate instances belonging to concepts. For example, the person "Sato" is an instance of the concept "employee". Instances have the relationship between concepts to which the instances belong.

FIG. 8C illustrates a specific example.

FIG. 8C illustrates the relationship of "Sato", an instance of "employee", with other instances. According to FIG. 8C, for example, "Sato" "belongs to" "development first section", an instance of the concept "section", and is "in charge of" "theme A", an instance of the concept "theme". "Theme A" is illustrated to have the relationship of "component technique" with "L technique", an instance of the concept "technique".

The information illustrated in FIGS. 8A, 8B, and 8C deals mainly with information about organizations and persons in a division. In the present exemplary embodiment, the division knowledge management system 320 also stores attribute information about contents. For example, if contents are a document, the division knowledge management system 320 stores a relationship structure about the concept "document" as illustrated in FIG. 9. The concept "document" has a relationship with concepts illustrated in FIG. 8. A document may have a keyword which is nothing more than simple text information. As illustrated in FIG. 9, a keyword may be defined to be stored as a text information node (hereinafter, referred to as a "text node") having no concept.

The division knowledge management system 320 stores information such as illustrated in FIGS. 8A, 8B, 8C and 9. Note that the structures and instances illustrated in FIGS. 8A, 8B, 8C, and 9 are given only as examples for describing the present exemplary embodiment. In fact, the division knowledge management system 320 stores more concepts and instances with definitions of many types of relationships. Examples of the division knowledge and ontology including the foregoing may include human resources information (such as management relationships and persons in charge), organization information (such as organizational structures and roles), theme systems (such as theme structures and related techniques), project systems (such as project structures, related organizations, and persons), technical systems (such as relationships between technically superordinate and subordinate concepts), thesauruses of division terms and company terms, and company social networking service (SNS) and social graphs (such as profile information about person's expertise, (non-organizational) direct acquaintances, user activities, and preferences).

In the present exemplary embodiment, the division knowledge management system 320 stores the information illustrated in FIGS. 8A, 8B, 8C, and 9 as described in a Resource Description Framework Schema (RDFS)/Web Ontology Language (OWL) format. RDFS/OWL is a description format for defining knowledge, standardized by the World Wide Web Consortium (W3C). Information indicating two concepts or instances connected with an arrow, like illustrated in FIGS. 8A, 8B, 8C, and 9, is the most basic description element in such a description format. The division knowledge management system 320 has a function of searching stored knowledge by using SPARQL Protocol and RDF Query Language (SPARQL). SPARQL is a language for describing queries for searching knowledge, also standardized by W3C. For example, the division knowledge management system 320 can provide an access unit for accessing knowledge, such as obtaining a relationship between two pieces of information and obtaining a piece of information having a specified relationship with a certain piece of information.

The information stored in the division knowledge management system 320 is associated with users and contents managed in the content management system 310. For example, user identifiers (IDs) used in the content management system 310 are associated with pieces of user attribute information stored in the division knowledge management system 320 in a one-to-one manner. Similarly, content attribute information about contents, such as organizations of submission and creators, can be identified, for example, by using content IDs managed in the content management system 310 as keys. In the present exemplary embodiment, the content management system 310 transmits various information to the recommendation apparatus 100. If the division knowledge management system 320 receives an inquiry about the information from the recommendation apparatus 100, the division knowledge management system 320 can return the corresponding information stored in the division knowledge management system 320.

Next, a functional configuration of the recommendation apparatus 100 illustrated in FIG. 3 will be described.

Figure 4:
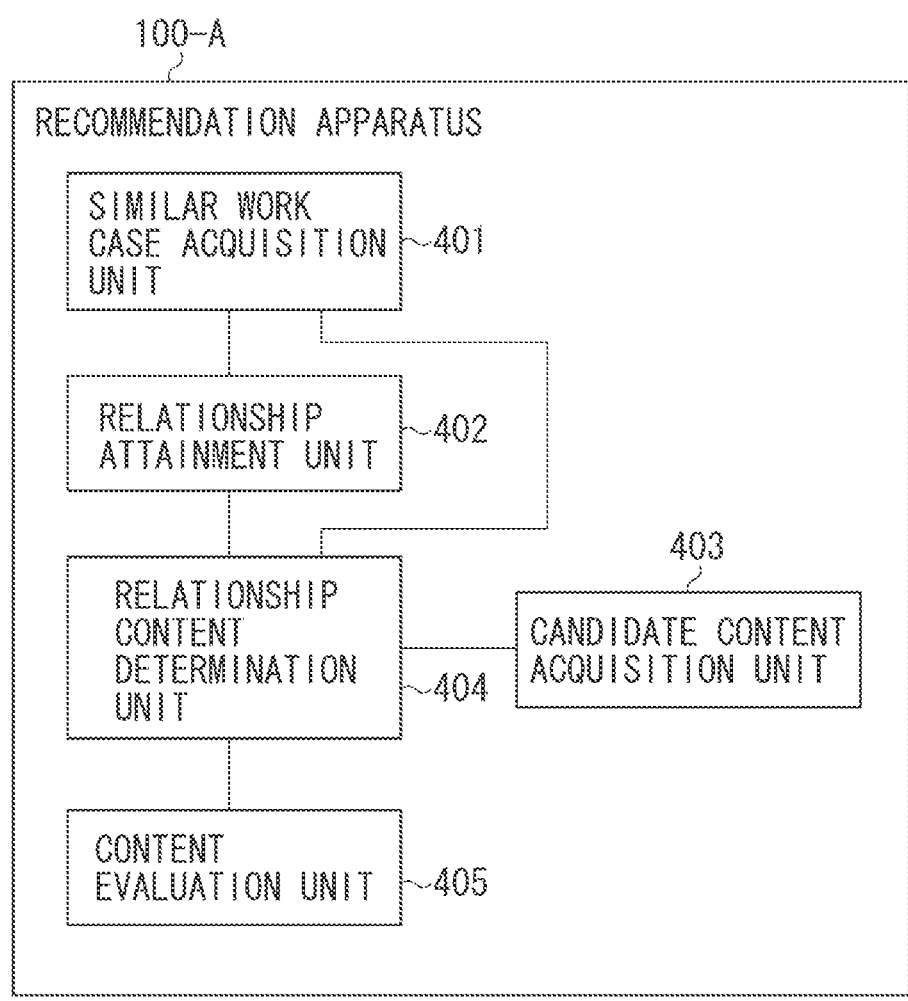
FIG. 4 is a block diagram illustrating an example of a functional configuration of the recommendation apparatus according to the first exemplary embodiment of the present invention.

FIG. 4 is a block diagram illustrating an example of the functional configuration of the recommendation apparatus according to the first exemplary embodiment of the present invention. The recommendation apparatus illustrated in FIG. 4 will hereinafter be referred to as a "recommendation apparatus 100-A".

As illustrated in FIG. 4, the recommendation apparatus 100-A includes a functional configuration including a similar work case acquisition unit 401, a relationship attainment unit 402, a candidate content acquisition unit 403, a relationship content determination unit 404, and a content evaluation unit 405.

The similar work case acquisition unit (first acquisition unit) 401 obtains information about known similar work cases similar to certain user work from the work-orientated recommendation apparatus 311. The recommendation unit 100 may perform the processing illustrated in FIG. 7 to obtain similar work cases. In the present exemplary embodiment, when the recommendation target user performs work on the content management system 310, the work-oriented recommendation apparatus 311 detects similar work of the work, and the similar work case acquisition unit 401 obtains information about the similar work case. For the information about the similar work case, the similar work case acquisition unit 401 obtains at least a recommendation target user ID for identifying the recommendation target ID, content IDs for identifying a group of simultaneously used contents in the similar work case, and a similar work case user ID for identifying the user who has performed the similar work case (hereinafter, referred to as "similar work case user"). If there is a plurality of similar work cases, the similar work case acquisition unit 401 obtains the contents IDs of a group of simultaneously used contents and the similar work case user ID with respect to each of the similar work cases.

The relationship attainment unit 402 refers to the information of the division knowledge management system 320 and attains a conceptual relationship between the similar work case user and the group of simultaneously used contents in the similar work case obtained by the similar work case acquisition unit 401. Specifically, the relationship attainment unit 402 initially obtains partial knowledge including the similar work case user, managed in the division knowledge management system 320, by using the similar work case user ID as a key. Similarly, the relationship attainment unit 402 obtains partial knowledge including the simultaneously used contents, managed in the division knowledge management system 320, by using the contents IDs as keys. If there is an achievable relationship between the two obtained pieces of partial knowledge, the relationship attainment unit 402 further obtains the achievable relationship and generates integrated partial knowledge that associates the pieces of partial knowledge. The relationship attainment unit 402 then attains a conceptual relationship. The conceptual relationship refers to what is obtained by replacing the instances included in the integrated partial knowledge with the concepts to which the instances belong, based on relation-defining information. Such processing will be described in more detail by using an example illustrated in FIGS. 10A, 10B, and 10C.

Figure 10A:
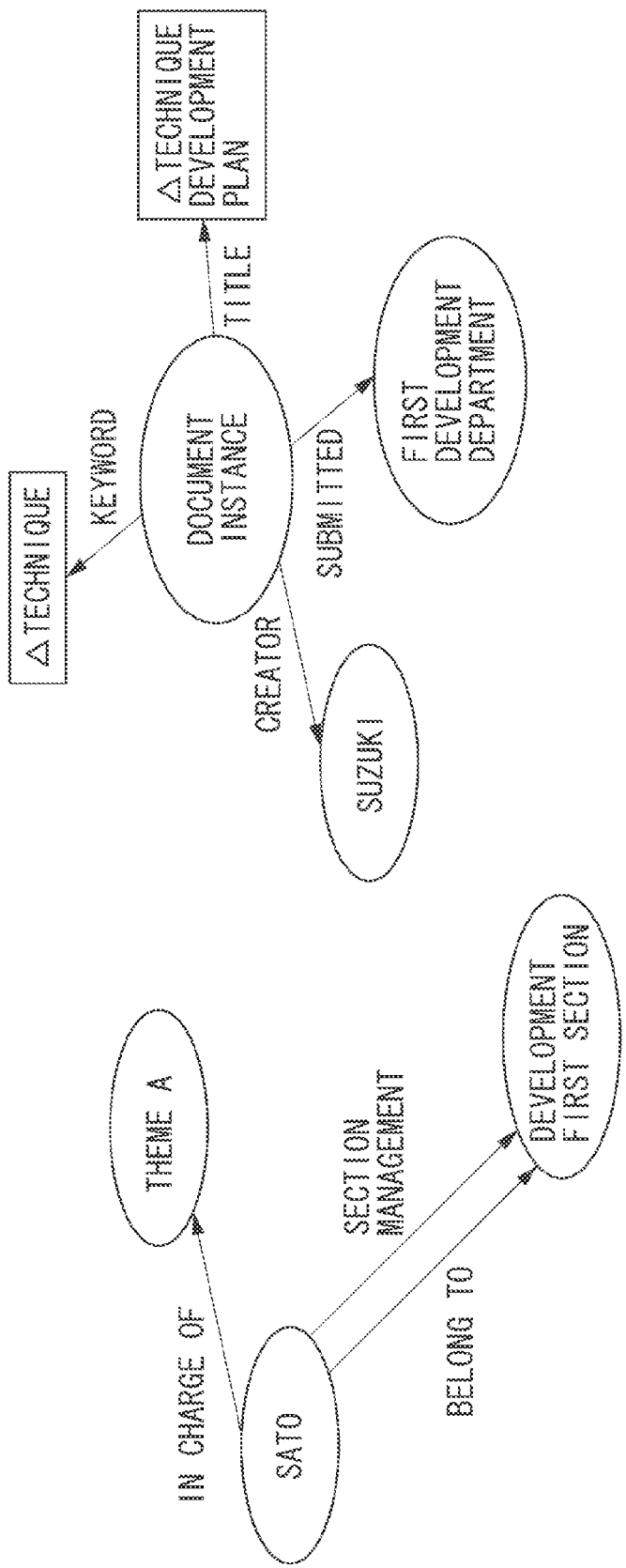
FIGS. 10A, 10B, and 10C are diagrams illustrating an example in which a conceptual relationship is attained from a relationship between a similar work case user and simultaneously used contents, according to the first exemplary embodiment of the present invention.
Figure 10B:
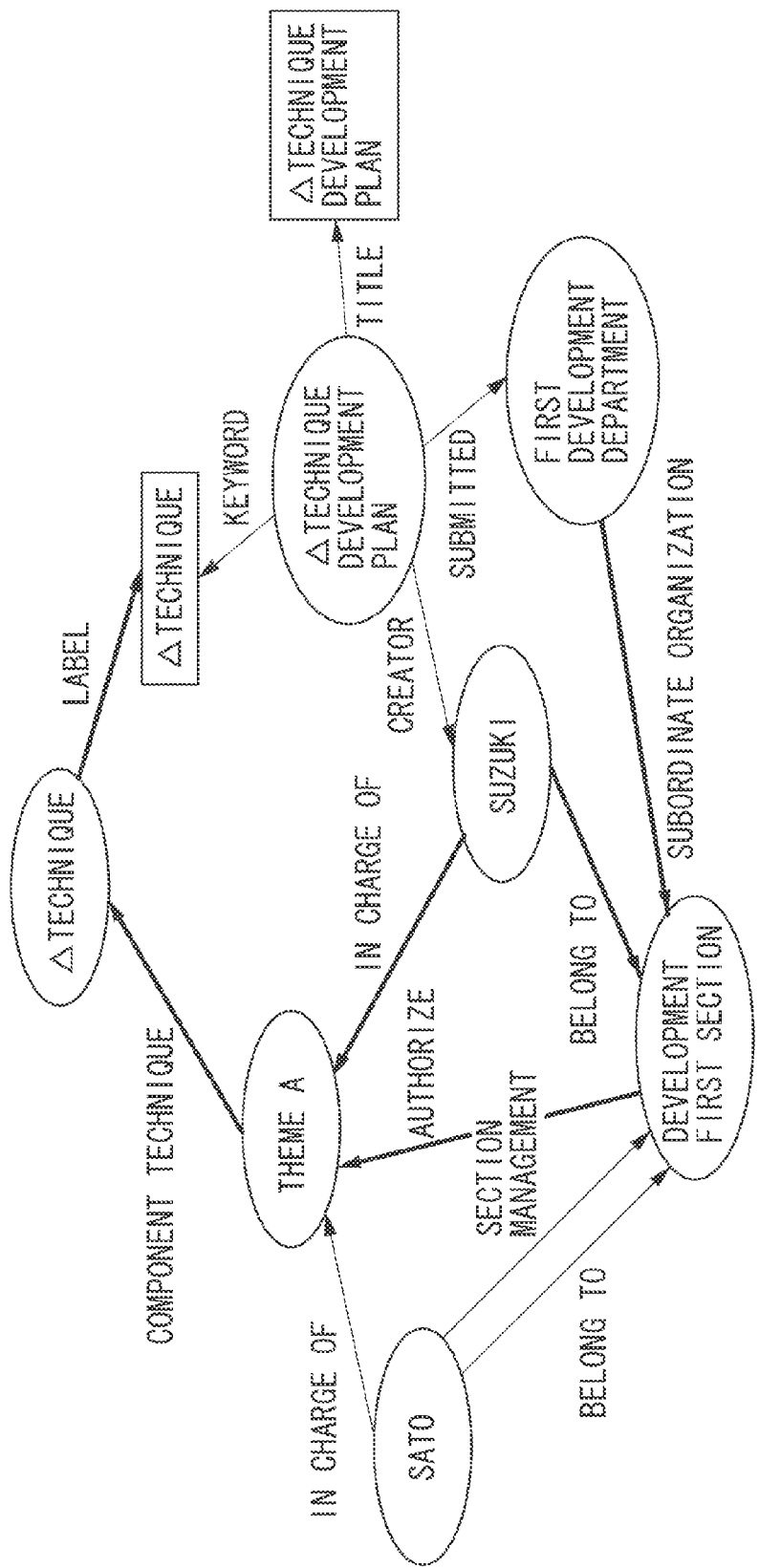
Figure 10C:
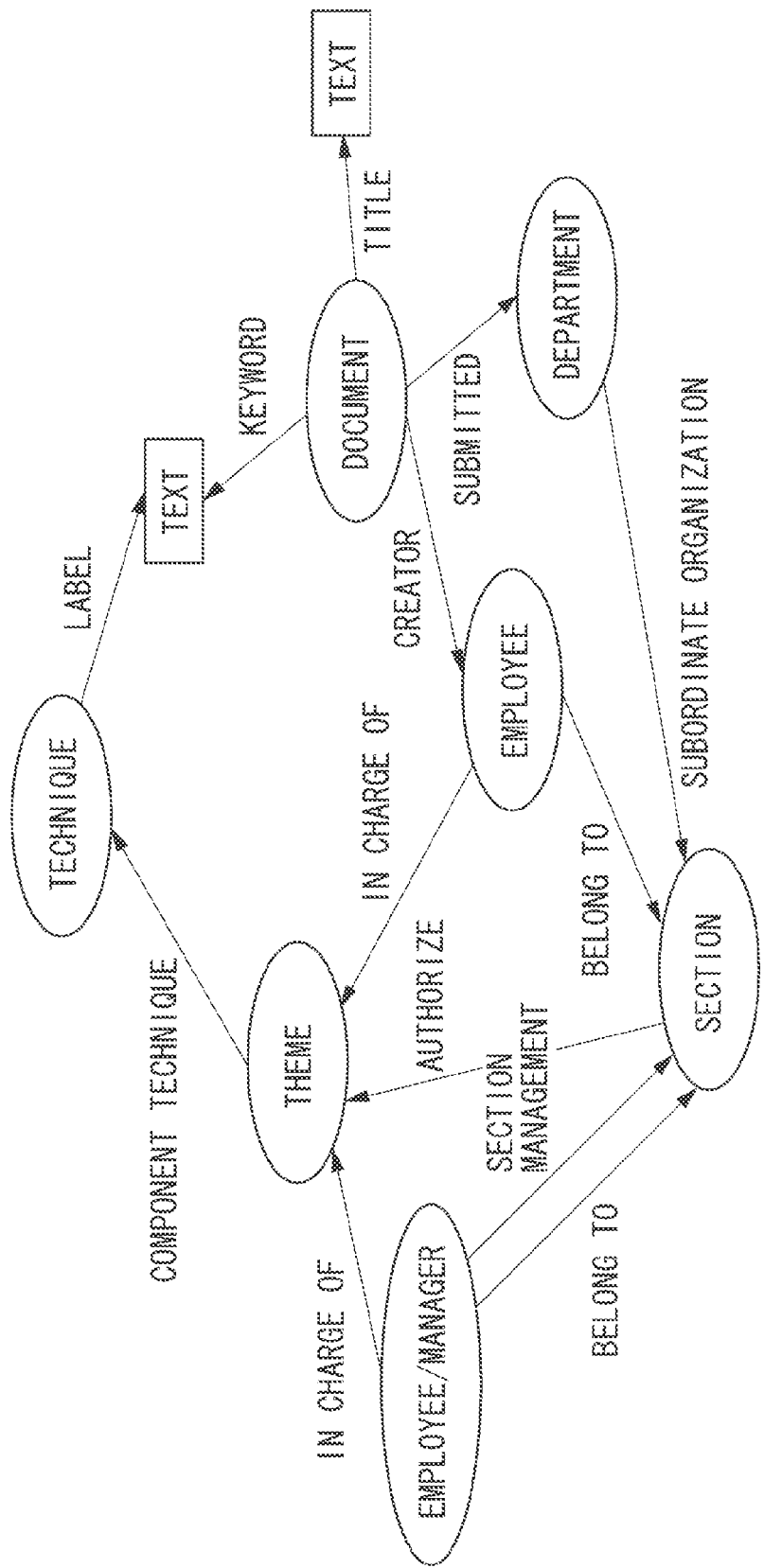

FIGS. 10A, 10B, and 10C are diagrams illustrating an example of attaining a conceptual relationship from a relationship between a similar work case user and simultaneously used contents according to the first exemplary embodiment of the present invention.

In the example illustrated in FIGS. 10A, 10B, and 10C, the information illustrated in FIGS. 8A, 8B, 8C, and 9 is also illustrated as far as possible.

FIG. 10A illustrates pieces of partial knowledge when the employee "Sato" is the similar work case user and a document "Δ technique development plan" is the simultaneously used contents. The left half of FIG. 10A illustrates an instance "Sato", a relationship accompanying the instance, and related instances. This corresponds to the partial knowledge obtained by obtaining instances directly related to "Sato" illustrated in FIG. 8C. The right half of FIG. 10A illustrates the conceptual structure of the contents illustrated in FIG. 9 in which specific instances are described. This expresses the partial knowledge obtained by obtaining instances directly related to "Δ technique development plan".

The relationship attainment unit 402 obtains a relationship between the two pieces of partial knowledge illustrated to the left and right of FIG. 10A from the division knowledge management system 320. FIG. 10B illustrates the pieces of partial knowledge to which the relationship therebetween is added. The diagram illustrated in FIG. 10B corresponds to the integrated partial knowledge described above. FIG. 10B illustrates the new added relationship and instances in thick lines. In the present exemplary embodiment, a keyword is text information. The relationship attainment unit 402 searches for instances that include the text information as a label by using pattern matching. In the illustrated example, the instance "Δ technique" of the concept "technique", having "Δ technique" as a label, is found.

FIG. 10C is a diagram obtained by replacing the instances in the diagram illustrated in FIG. 10B with concepts that are applicable as nodes of the respective relationships. The relationship illustrated in FIG. 10C obtained thus is the conceptual relationship. FIG. 10C illustrates the conceptual relationship between a concept "employee/manager" illustrated to the left end and the concept "document". The relationship content determination unit 404 to be described below determines whether there is an instance of "contents (document)" such that the conceptual relationship holds between the recommendation target user and the instance.

The candidate content acquisition unit (second acquisition unit) 403 obtains the IDs of a group of recommendation candidate contents in the work in progress from the work-oriented recommendation apparatus 311. The recommendation apparatus 100 may perform the processing illustrated in FIG. 7 to obtain a group of recommendation candidate contents.

The relationship content determination unit 404 determines whether the relationship attained by the relationship attainment unit 402 holds between the recommendation target user currently at work, obtained by the similar work case acquisition unit 401, and the group of recommendation candidate contents obtained by the candidate content acquisition unit 403. Specifically, in the present exemplary embodiment, the relationship content determination unit 404 generates inquiry queries for the division knowledge management system 320 from the conceptual relationship attained by the relationship attainment unit 402, the recommendation target user ID, and the IDs of the group of recommendation candidate contents. The relationship content determination unit 404 then determines whether there are consistent contents. A further description will be given below with reference to FIG. 11.

FIG. 11 is a diagram illustrating an example of contents between which and the recommendation target user the conceptual relationship holds true according to the first exemplary embodiment of the present invention. Specifically, FIG. 11 illustrates an example where the recommendation target user is "Tanaka".

The relationship content determination unit 404 applies "Tanaka" to "employee/manager" in the conceptual relationship of FIG. 10C, and determines whether there are contents having a consistent relationship. Specifically, the relationship content determination unit 404 generates a query like 'What are contents c such that that a "theme instance a" of which "Tanaka" (employee) is in charge has a "technique instance b" as an element technique and the "contents (document instance) c" have the "technique instance b" as a keyword (label) is true?' The relationship content determination unit 404 then inquires of the division knowledge management system 320 about the query. Similarly, the relationship content determination unit 404 generates a query about another relationship like 'What are contents c such that that a "section instance d" which "Tanaka" manages (as manager) is a subordinate organization of a "department instance e" to which the "contents c" are submitted is true?' In such a manner, the relationship content determination unit 404 performs similar verifications on all the relationships to determine whether there are consistent contents in the group of recommendation candidate contents. In the example of FIG. 11, the document instance "technical report" is determined to be consistent contents.

The content evaluation unit 405 evaluates validity as recommendation contents for the recommendation target user currently at work, based on the result of determination of the relationship content determination unit 404. For example, when that the relationship content determination unit 404 determines that there are contents having the relationship attained by the relationship attainment unit 402 with the recommendation target user, the content evaluation unit 405 evaluates such contents as having validity for recommendation to the recommendation target user.

An example of correspondence between the functional components illustrated in FIG. 4 and the hardware components illustrated in FIG. 1 or 2 will be described below.

For example, the similar work case acquisition unit 401, the relationship attainment unit 402, the candidate content acquisition unit 403, and the relationship content determination unit 404 illustrated in FIG. 4 are constituted by the CPU 101 and a program stored in the external storage device 104 illustrated in FIG. 1 (or the CPU 101, a program stored in the external storage device 104, and the network interface 201 illustrated in FIG. 2).

For example, the content evaluation unit 405 illustrated in FIG. 4 is constituted by the CPU 101 and a program stored in the external storage device 104 illustrated in FIG. 1 (or the CPU 101 and a program stored in the external storage device 104 illustrated in FIG. 2).

Next, processing of a recommendation method by the recommendation system 300 according to the present exemplary embodiment will be described.

Figure 5:
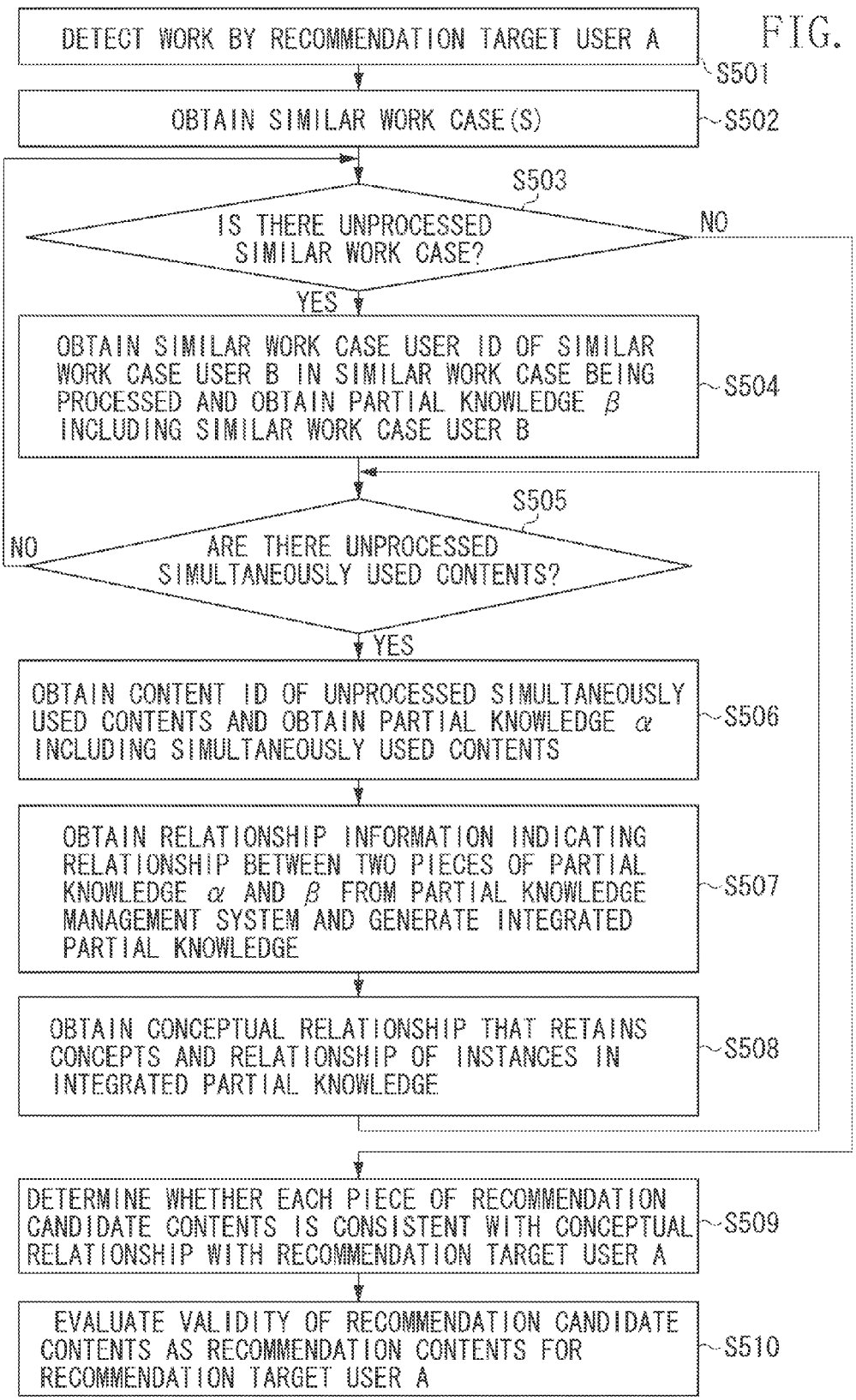
FIG. 5 is a flowchart illustrating an example of a processing procedure of a recommendation method by the recommendation system according to the first exemplary embodiment of the present invention.

FIG. 5 is a flowchart illustrating an example of a processing procedure of the recommendation method by the recommendation system 300 according to the first exemplary embodiment of the present invention. The processing of the flowchart illustrated in FIG. 5 is predicated on the assumption that a recommendation target user A is currently performing some work on the content management system 310. The content management system 310 is assumed to have been keeping a log of the work.

In step S501, the work-oriented recommendation apparatus 311 monitoring the work log of the recommendation target user A detects the work by the recommendation target user A. Specifically, the work-oriented recommendation apparatus 311 detects the work by the recommendation target user A by identifying which the work by the recommendation target user A is among the pieces of work already analyzed as work patterns.

In step S502, the work-oriented recommendation apparatus 311 detects a similar work case or cases, i.e., a past case or cases similar to the current work based on the work pattern of the work by the recommendation target user A. The similar work case acquisition unit 401 then obtains information about the similar work case(s) from the work-oriented recommendation apparatus 311. For the information about a similar work case(s), the similar work case acquisition unit 401 obtains a recommendation target user ID for identifying the recommendation target user, contents IDs for identifying a group of simultaneously used contents in the similar work case(s), and a similar work case user ID or IDs for identifying a similar work case user or users.

The processing of the subsequent steps S503 to S508 is performed by the relationship attainment unit 402.

In step S503, the relationship attainment unit 402 determines whether there is an unprocessed similar work case among all the similar work case(s) obtained in step S502.

In step S503, if it is determined there is an unprocessed similar work case (YES in step S503), the relationship attainment unit 402 advances the processing to step S504. The relationship attainment unit 402 performs the processing of step S504 and the subsequent steps on the unprocessed similar work case.

In step S504, the relationship attainment unit 402 obtains the similar work case user ID of a similar work case user B in the similar work case currently being processed from the information about the similar work case(s) obtained in step S502. The relationship attainment unit 402 obtains partial knowledge β including the similar work case user B from the division knowledge management system 320 by using the obtained similar work case user ID as a key.

In step S505, the relationship attainment unit 402 determines whether there are unprocessed simultaneously used contents among all the simultaneously used contents in the similar work case currently being processed.

In step S505, if it is determined that there is no unprocessed simultaneously used contents (NO in step S505), the relationship attainment unit 402 returns the processing to step S503.

In step S505, if it is determined that there are unprocessed simultaneously used contents (YES in step S505), the relationship attainment unit 402 advances the processing to step S506.

In step S506, the relationship attainment unit 402 obtains the content ID of the simultaneously used contents determined to be unprocessed in step S505 from the information about the similar work case(s) obtained in step S502. The relationship attainment unit 402 obtains partial knowledge α including the simultaneously used contents from the division knowledge management system 320 by using the obtained content ID as a key.

In step S507, the relationship attainment unit 402 obtains relationship information indicating a relationship between the two pieces of partial knowledge, i.e., the partial knowledge α obtained in step S506 and the partial knowledge β obtained in step S504 from the division knowledge management system 320. The relationship attainment unit 402 generates integrated partial knowledge.

In step S508, the relationship attainment unit 402 attains a conceptual relationship retaining the concepts and relationship of the instances in the integrated partial knowledge generated in step S507. After the end of the processing of step S508, the relationship attainment unit 402 returns the processing to step S505.

In step S503, if it is determined that there is no unprocessed similar work case (NO in step S503), the relationship attainment unit 402 advances the processing to step S509.

In step S509, the relationship content determination unit 404 obtains the recommendation target user ID of the recommendation target user A from the information about the similar work case(s) obtained in step S502. The relationship content determination unit 404 obtains the conceptual relationship attained in step S508 and inquires of the division knowledge management system 320 whether there are contents consistent with the conceptual relationship with the recommendation target user A. The candidate content acquisition unit 403 obtains the IDs of a group of recommendation candidate contents in the current work of the recommendation target user A from the work-oriented recommendation apparatus 311. The relationship content determination unit 404 obtains the IDs of the group of recommendation candidate contents from the candidate content acquisition unit 403. The relationship content determination unit 404 determines whether each piece of the recommendation candidate contents in the group of recommendation candidate contents is such consistent contents.

Note that the candidate content acquisition unit 403 may obtain (the IDs of) a group of recommendation candidate contents first, and may present the group of recommendation candidate contents to the division knowledge management system 320 at the time of the foregoing inquiry so that the division knowledge management system 320 performs the determination. In the present exemplary embodiment, if a plurality of similar work cases is obtained in step S502 or if a similar work case includes a plurality of pieces of simultaneously used contents, a plurality of conceptual relationships is obtained in step S508. In such a case, the relationship content determination unit 404 may repeat the processing on each of the obtained conceptual relationships.

In step S510, the content evaluation unit 405 receives the result of the determination in step S509, and evaluates validity as recommendation contents for the recommendation target user A currently at work. More specifically, in step S510, the content evaluation unit 405 evaluates the validity of the recommendation candidate contents determined in step S509 as recommendation contents from a viewpoint of the recommendation target user A currently at work. Here, the content evaluation unit 405 provides at least information about whether each piece of the recommendation candidate contents in the group of recommendation candidate contents determined in step S509 are contents consistent with the conceptual relationship attained in step S508.

In the present exemplary embodiment, the division knowledge management system 320 is assumed to provide the access unit for accessing knowledge needed for the operation of the recommendation apparatus 100. However, such an access unit may not always be provided. In such a case, the recommendation apparatus 100 may be configured as illustrated in FIG. 6.

Figure 6:
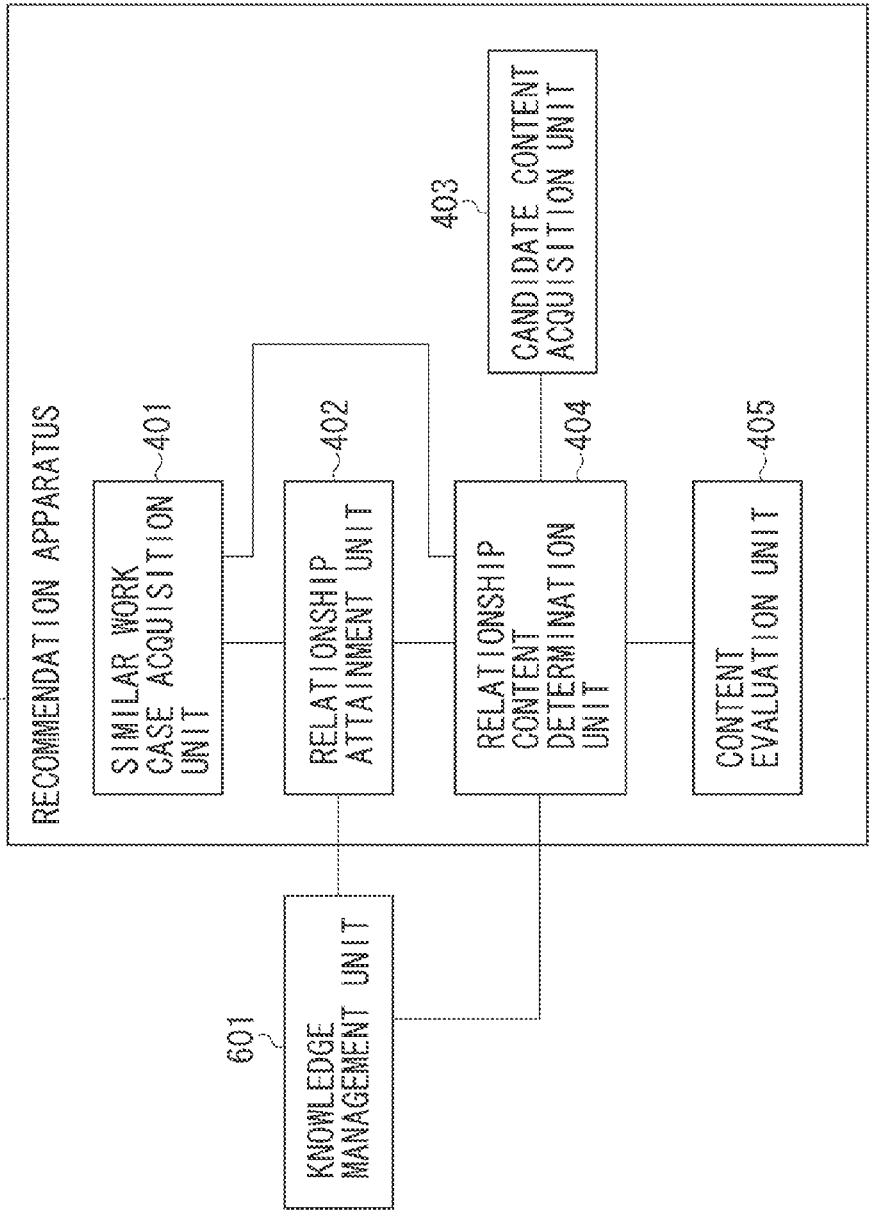
FIG. 6 is a block diagram illustrating an example of the functional configuration of the recommendation apparatus according to the first exemplary embodiment of the present invention.

FIG. 6 is a block diagram illustrating an example of a functional configuration of the recommendation apparatus according to the first exemplary embodiment of the present invention. The recommendation apparatus illustrated in FIG. 6 will hereinafter be referred to as a "recommendation apparatus 100-B". In FIG. 6, similar components to those illustrated in FIG. 4 are designated by the same reference numerals.

Specifically, the recommendation apparatus 100-B illustrated in FIG. 6 is the recommendation apparatus 100-A illustrated in FIG. 4 to which a functional configuration of a knowledge management unit 601 is added. The knowledge management unit 601 includes the foregoing access unit.

More specifically, the knowledge management unit 601 performs processing for interpreting an inquiry for knowledge like SPARQL described above and searching the division knowledge management system 320 for information satisfying the interpreted content. Such an access unit for accessing knowledge may be a general-purpose one using the foregoing standardized techniques.

For example, the knowledge management unit 601 is constituted by the CPU 101 and a program stored in the external storage device 104 illustrated in FIG. 1 (or the CPU 101, a program stored in the external storage device 104, and the network interface 201 illustrated in FIG. 2).

The processing of the present exemplary embodiment can be performed to evaluate the validity of a group of recommendation candidate contents retained as recommendation candidate contents in the work-oriented recommendation apparatus 311 from the viewpoint of the recommendation target user A. As a result, contents more useful in performing the work can be recommended to the recommendation target user who is the current work user. This can improve the work efficiency of the user as compared to the conventional recommendation techniques.

A second exemplary embodiment will be described. In the first exemplary embodiment described above, the content evaluation unit 405 only provides information about whether recommendation candidate contents are consistent with a conceptual relationship attained by the relationship attainment unit 402. The present invention is not limited thereto. For example, if a plurality of conceptual relationships is attained by the relationship attainment unit 402, the content evaluation unit 405 may perform evaluation to give greater importance to contents that are consistent with a greater number of conceptual relationships. In such a case, in step S509, the relationship content determination unit 404 may determine whether the recommendation candidate contents are consistent with each of the conceptual relationships. The more frequently the determinations are true, the higher the recommendation candidate contents may be evaluated as recommendation contents.

A third exemplary embodiment will be described. In the first exemplary embodiment, if a plurality of similar work cases is obtained in step S502, all the similar work cases are subjected to the processing. The present invention is not limited thereto. For example, if a plurality of similar work cases is obtained in step S502, the relationship attainment unit 402 may perform the relationship-attaining processing only on a predetermined number of similar work cases. For company use, the relationship content determination unit 404 may verify similar work cases of similar work case users having a position (such as post and affiliation) close to the recommendation target user first.

A fourth exemplary embodiment will be described. In the exemplary embodiments described above, contents consistent with all the relationships in the conceptual relationship may not be found. In such a case, the relationship content determination unit 404 may determine whether contents are consistent, for example, based on whether the instance of the recommendation target user can reach the instance of the target contents at least via instances of the concepts included in the conceptual relationship. In other words, if the instances have at least a relationship therebetween, the contents may be considered consistent despite partial inconsistency of the conceptual relationship. With such relaxation of conditions, contents that satisfy stricter conditions may be evaluated higher.

A fifth exemplary embodiment will be described. If the conditions of the conceptual relationship are relaxed as described in the fourth exemplary embodiment, concepts may be replaced with superordinate ones. In the first exemplary embodiment, subordinate concepts inherit the relationship of superordinate concepts. Instances of subordinate concepts can be true by an ordinary search while instances of superordinate concepts are not. However, if posts or organizations are close and the conceptual relationship holds between instances of superordinate concepts, such superordinate concepts may be considered as valid evaluation targets. Even in such a case, replacements that would break the relationship between the defined concepts is desirably avoided. For example, "section" and "department" of FIG. 10C may be replaced with the superordinate concept "organization" as illustrated in FIG. 12.

Figure 12:
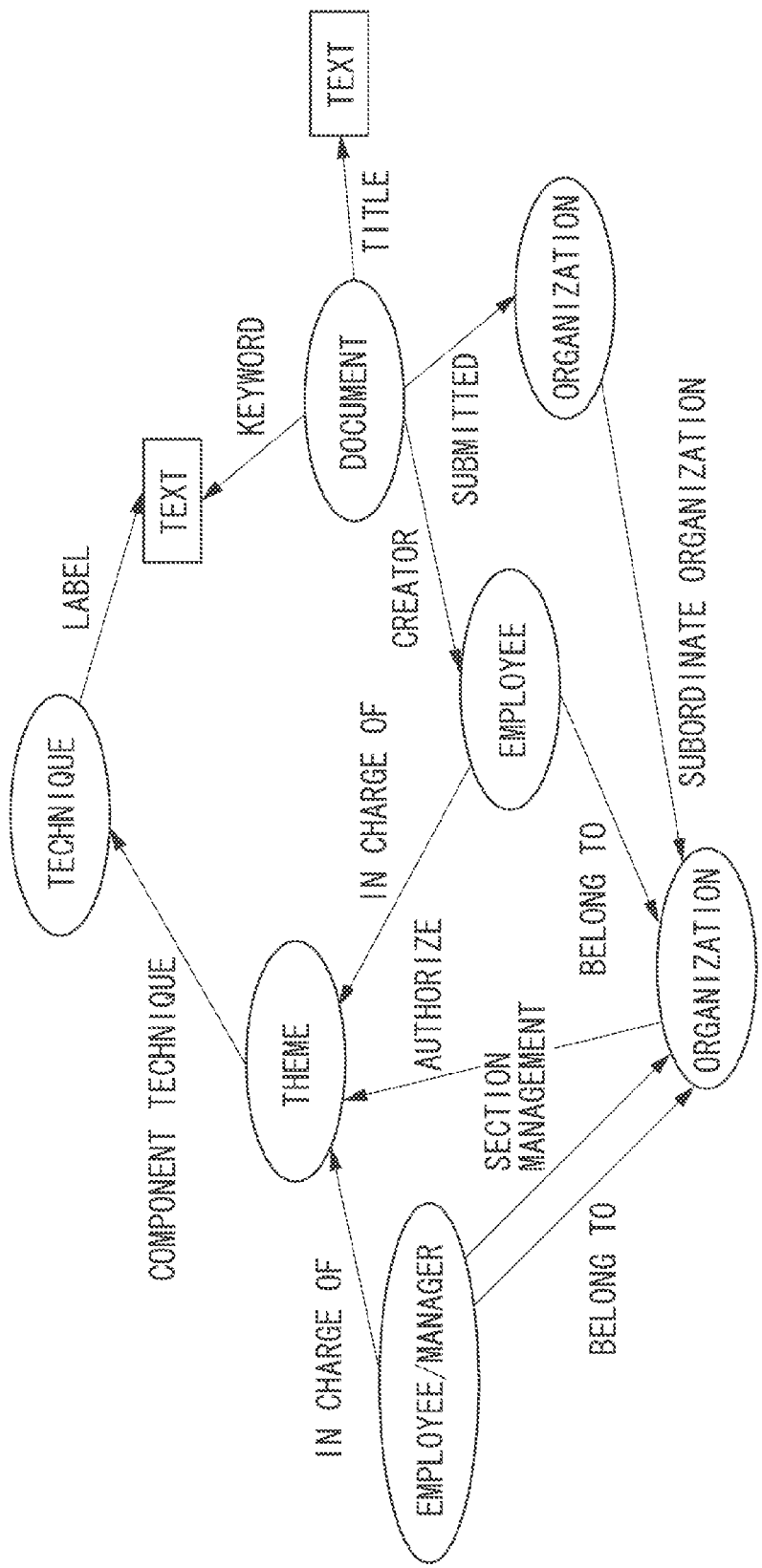
FIG. 12 is a diagram an example where some of the concepts in the conceptual relationship illustrated in FIG. 10C are replaced with superordinate concepts, according to a fifth exemplary embodiment of the present invention.

FIG. 12 is a diagram illustrating the fifth exemplary embodiment of the present invention. The diagram illustrates an example where some of the concepts in the conceptual relationship illustrated in FIG. 10 are replaced with superordinate ones.

With such relaxation of conditions, contents with fewer replacements of concepts may be evaluated higher.

A sixth exemplary embodiment will be described. In the first exemplary embodiment described above, text information not belonging to any concept is used as a keyword of document contents. However, instances of concepts may be assigned thereto as keywords. If a user manually attaches keywords registered in the content management system 310 as tags, the user can assign instances having a known conceptual structure. This can suppress omissions due to erroneous labeling of instances and mistakes due to accidental use of instance names as keywords, which may occur in pattern matching using text information.

A seventh exemplary embodiment will be described. The first exemplary embodiment described above has dealt with the case where the contents are documents. The present invention is not limited thereto. For example, photographs and moving images may be applied as contents.

According to an exemplary embodiment of the present invention, contents more useful in performing work can be recommended to the recommendation target user who is the current work user. This can improve the work efficiency of the user as compared to the conventional recommendation techniques.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-073891 filed Mar. 29, 2013, which is hereby incorporated by reference herein in its entirety.

What is claimed is:

1. A recommendation apparatus that recommends contents to a recommendation target user that is a current user of the recommendation apparatus, comprising:
   a processor and memory;
   a recommendation unit;
   a content management unit; and
   a relationship storage unit,
   wherein a group of recommendation candidate contents is obtained from the content management unit, the group of recommendation candidate contents being candidates to be used by the recommendation target user,
   wherein a relationship is detected between a user of a similar work case similar to work by the recommendation target user and used contents of the similar work case obtained from the content management unit,
   wherein the used contents of the similar work case include contents other than the recommendation candidate contents, and the recommendation candidate contents include contents other than the used contents of the similar work case,
   wherein the relationship between a user and contents is held in the relationship storage unit,
   wherein the recommendation unit recommends recommendation candidate contents having the detected relationship with the recommendation target user by priority from among the group of recommendation candidate contents excluding the used contents of the similar work case,
   wherein at least one of the units is implemented upon execution of instructions stored in the memory by the processor.

2. The recommendation apparatus according to claim 1, wherein the relationship stored in the relationship storage unit is written in an RDFS/OWL format.

3. The recommendation apparatus according to claim 1, wherein the relationship stored in the relationship storage unit is written in a graph format.

4. The recommendation apparatus according to claim 1, wherein the recommendation unit is configured to determine contents having the detected relationship with the recommendation target user by using a SPARQL language.

5. The recommendation apparatus according to claim 1, wherein the group of recommendation candidate contents is obtained from a similar work case including simultaneously used contents.

6. The recommendation apparatus according to claim 1, wherein the recommendation unit is configured to, if there is no recommendation candidate contents having the detected relationship with the recommendation target user, recommend recommendation candidate contents having a relationship of a superordinate concept with the recommendation target user.

7. The recommendation apparatus according to claim 1, wherein the recommendation unit comprises:
   a similar case acquisition unit that obtains information about known similar work cases similar to certain user work from the content management unit;
   a relationship attainment unit that refers to and attains a conceptual relationship between the similar work case user and the a group of simultaneously used contents in the similar work case obtained by the similar case acquisition unit;
   a relationship content determination unit that performs a verification on the relationship to determine whether there are consistent contents in the group of recommendation contents;
   a candidate content acquisition unit that obtains IDs of a group of recommendation candidate contents from the content management unit; and
   a content evaluation unit that evaluates validity of recommended contents for the recommendation target user, based on a result of the relationship content determination unit,
   wherein at least one of the units is implemented upon execution of instructions stored in the memory by the processor.

8. The recommendation apparatus according to claim 1, wherein the relationship is detected between a user of similar work case and the recommendation candidate contents obtained from the content management unit.

9. The recommendation apparatus according to claim 1, wherein contents used in a past similar work are excluded from the recommendation candidate contents.

10. A recommendation method performed in an apparatus that recommends contents to a recommendation target user that is a current user of the apparatus, the apparatus including units which are implemented upon execution of instructions stored in memory by a processor, the method comprising:
    via a content management unit, obtaining a group of recommendation candidate contents, the group of recommendation candidate contents being candidates to be used by the recommendation target user,
    detecting a relationship between a user of a similar work case similar to work by the recommendation target user and used contents of the similar work case obtained from the content management unit; and
    via a recommendation unit, recommending recommendation candidate contents having the detected relationship with the recommendation target user by priority from among the group of recommendation candidate contents excluding the used contents of the similar work case,
    wherein the used contents of the similar work case include contents other than the recommendation candidate contents, and the recommendation candidate contents include contents other than the used contents of the similar work case,
    wherein the relationship between a user and contents is held in the relationship storage unit.

11. The recommendation method according to claim 10, further comprising:
    via a similar case acquisition unit, obtaining information about known similar work cases similar to certain user work from the content management unit;
    via a relationship attainment unit, referring to and attaining a conceptual relationship between the similar work case user and the a group of simultaneously used contents in the similar work case obtained by the similar case acquisition unit;
    via a relationship content determination unit, performing a verification on the relationship to determine whether there are consistent contents in the group of recommendation contents;
    via a candidate content acquisition unit, obtaining IDs of a group of recommendation candidate contents from the content management unit; and via a content evaluation unit, evaluating validity of recommended contents for the recommendation target user, based on a result of the relationship content determination unit.

12. The medium according to claim 10, further comprising:

via a similar case acquisition unit, obtaining information about known similar work cases similar to certain user work from the content management unit;

via a relationship attainment unit, referring to and attaining a conceptual relationship between the similar work case user and the a group of simultaneously used contents in the similar work case obtained by the similar case acquisition unit;

via a relationship content determination unit, performing a verification on the relationship to determine whether there are consistent contents in the group of recommendation contents;

via a candidate content acquisition unit, obtaining IDs of a group of recommendation candidate contents from the content management unit; and via a content evaluation unit, evaluating validity of recommended contents for the recommendation target user, based on a result of the relationship content determination unit.

13. A non-transitory computer-readable storage medium storing a program for causing a computer to perform a recommendation method comprising:

via a content management unit, obtaining a group of recommendation candidate contents, the group of recommendation candidate contents being candidates to be used by the recommendation target user;

detecting a relationship between a user of a similar work case similar to work by the recommendation target user and used contents of the similar work case obtained from the content management unit; and via a recommendation unit, recommending recommendation candidate contents having the detected relationship with the recommendation target user by priority from among the group of recommendation candidate contents excluding the used contents of the similar work case, wherein the used contents of the similar work case include contents other than the recommendation candidate contents, and the recommendation candidate contents include contents other than the used contents of the similar work case, wherein the relationship between a user and contents is held in the relationship storage unit.

* * * * *